(12) United States Patent
Padval et al.

(10) Patent No.: US 12,182,279 B2
(45) Date of Patent: Dec. 31, 2024

(54) TECHNIQUES FOR PROVIDING SECURITY-RELATED INFORMATION

(71) Applicant: VANTA INC., San Francisco, CA (US)

(72) Inventors: Sanjay Umesh Padval, New York, NY (US); Lauren Joyce Adiova, San Diego, CA (US); Ritvik Sunil Annam, San Francisco, CA (US); Kevin Chen, San Francisco, CA (US); Frederick Wonbae Chung, San Francisco, CA (US); Walton Lawrence Seymour, New York, NY (US)

(73) Assignee: VANTA INC., San Francisco, CA (US)

( * ) Notice: Subject to any disclaimer, the term of this patent is extended or adjusted under 35 U.S.C. 154(b) by 280 days.

(21) Appl. No.: 17/825,643

(22) Filed: May 26, 2022

(65) Prior Publication Data
US 2023/0385430 A1 Nov. 30, 2023

(51) Int. Cl.
*G06F 21/60* (2013.01)

(52) U.S. Cl.
CPC .................. *G06F 21/604* (2013.01)

(58) Field of Classification Search
CPC .................................................... G06F 21/604
USPC .............................................. 726/1; 709/224
See application file for complete search history.

(56) References Cited

U.S. PATENT DOCUMENTS

| | | | |
|---|---|---|---|
| 7,975,286 B1* | 7/2011 | Fickey | H04L 63/20 726/4 |
| 2010/0228599 A1* | 9/2010 | Mamorsky | G06Q 10/0637 705/7.36 |
| 2017/0200476 A1* | 7/2017 | Chen | G06F 16/13 |
| 2018/0359222 A1 | 12/2018 | Hathaway et al. | |
| 2020/0159959 A1* | 5/2020 | Larson | G06F 21/60 |
| 2021/0410051 A1* | 12/2021 | Bouchet | H04W 88/08 |
| 2022/0210196 A1* | 6/2022 | Parekh | H04L 63/0227 |

OTHER PUBLICATIONS

Mendenhall; "Creating Trust Through Transparency: Vendor Trust Reports now available"; Jan. 3, 2022; Conveyor; retrieved from <https://web.archive.org/web/20220705035457/https://www.conveyor.com/blog/creating-trust-through-transparency> on May 11, 2023.
(Continued)

*Primary Examiner* — Liang Che A Wang
(74) *Attorney, Agent, or Firm* — Lando & Anastasi, LLP

(57) ABSTRACT

Techniques are described for a computing system to provide security-related information by (a) storing, by the computing system, security-related documents about a service provider; (b) monitoring, by the computing system, services provided by the service provider for a plurality of security-related features, and storing monitoring results; (c) receiving, by the computing system, a request to report security-related information about the service provider; (d) in response to receiving the request, creating a link for accessing the security-related documents and the monitoring results; and (e) in response to a user accessing the link, providing, by the computing system, the user with access to the security-related documents and monitoring results. A system, apparatus, and computer program product for performing this method and similar methods are also described.

15 Claims, 4 Drawing Sheets

(56) References Cited

OTHER PUBLICATIONS

Qiu; "Feature Spotlight: Trust Center Updates"; Jan. 11, 2022; Safebase; retrieved from <https://safebase.io/blog/blog-post-feature-spotlight-trust-center-updates> on May 17, 2023.
Willemin; "What is a Trust Center and why does your business need one?"; Jan. 11, 2022; Trustpage: retrieved from <https://trustpage.com/blog/what-is-a-trust-center-and-why-does-your-business-need-one> on May 17, 2023.
Whistic; "Oct. 2021 Product Release"; Oct. 29, 2021; Whistic; retrieved from <https://www.whistic.com/resources/october-2021-product-release> on May 11, 2023.
International Search Report and Written Opinion from corresponding International Application No. PCT/US2023/023197 dated Aug. 21, 2023.

\* cited by examiner

TECHNIQUES FOR PROVIDING SECURITY-RELATED INFORMATION

BACKGROUND

Service providers may provide various online services to customers. Security and data privacy are important considerations in such relationships. If the service provider does not provide adequate security or if the service provider does not maintain the privacy of the customer's data, then the customer may face numerous negative consequences. Therefore, prior to engaging a service provider, customers may interrogate the service provider to ensure such security and data privacy are provided adequately for the customer's needs. For example, a customer may request a certification from a third party, such as a SOC-2 certificate. Customers may also submit questions to the service provider, requesting that the service provider provide answers in response to those questions.

SUMMARY

However, customers requesting specific information from a service provider may be quite inefficient as well as incomplete. For example, different customers may request many of the same certificates from the service provider, but requests must go back and forth for those same certificates over and over again as different customers seek to engage the service provider. Similarly, different customers may request various other documents (e.g., policy documents, penetration test results, etc.) from the service provider, and there is likely to be considerable overlap among the particular documents requested. In addition, many of the questions submitted by different customers may be nearly the same, and the service provider may provide the same answers to many of these questions. Thus, considerable time and communication resources may be wasted sending the same (or nearly the same) requests and responses back and forth between the service provider and its potential customers. In addition, merely providing documents and responses may not be enough to assure a customer about the security and data privacy of the service provider.

Thus, it would be desirable to implement a tool that allows a service provider to send the same information to all (or many) potential customers, freeing the customers from having to individually request information and freeing the service providers from having to provide individualized responses to every potential customer. It would also be desirable to allow a monitoring service to monitor the services provided by the service provider in real-time for security-related features, ensuring that security and data privacy policies are actually followed and that documents are updated regularly. A tool may allow the service provider to select documents to provide to all requesting customers. The tool may further allow the service provider to select particular security-related features to be monitored and reported on in real-time. Customers may be provided with a link to an updated report at which the customer may view the documents as well as the real-time results of the monitored security-related features. In some embodiments, a customer may be assigned an individualized secure link in response to the service provider requesting access for that customer. In other embodiments, the service provider may request that a public link be created for use by any customer.

In one embodiment, a method is described for a computing system to provide security-related information by (a) storing, by the computing system, security-related documents about a service provider; (b) monitoring, by the computing system, services provided by the service provider for a plurality of security-related features, and storing monitoring results; (c) receiving, by the computing system, a request to report security-related information about the service provider; (d) in response to receiving the request, creating a link for accessing the security-related documents and the monitoring results; and (e) in response to a user accessing the link, providing, by the computing system, the user with access to the security-related documents and monitoring results. A system, apparatus, and computer program product for performing this method and similar methods are also described.

BRIEF DESCRIPTION OF THE DRAWINGS

The foregoing and other objects, features, and advantages will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of various embodiments.

DETAILED DESCRIPTION

Figure 1:
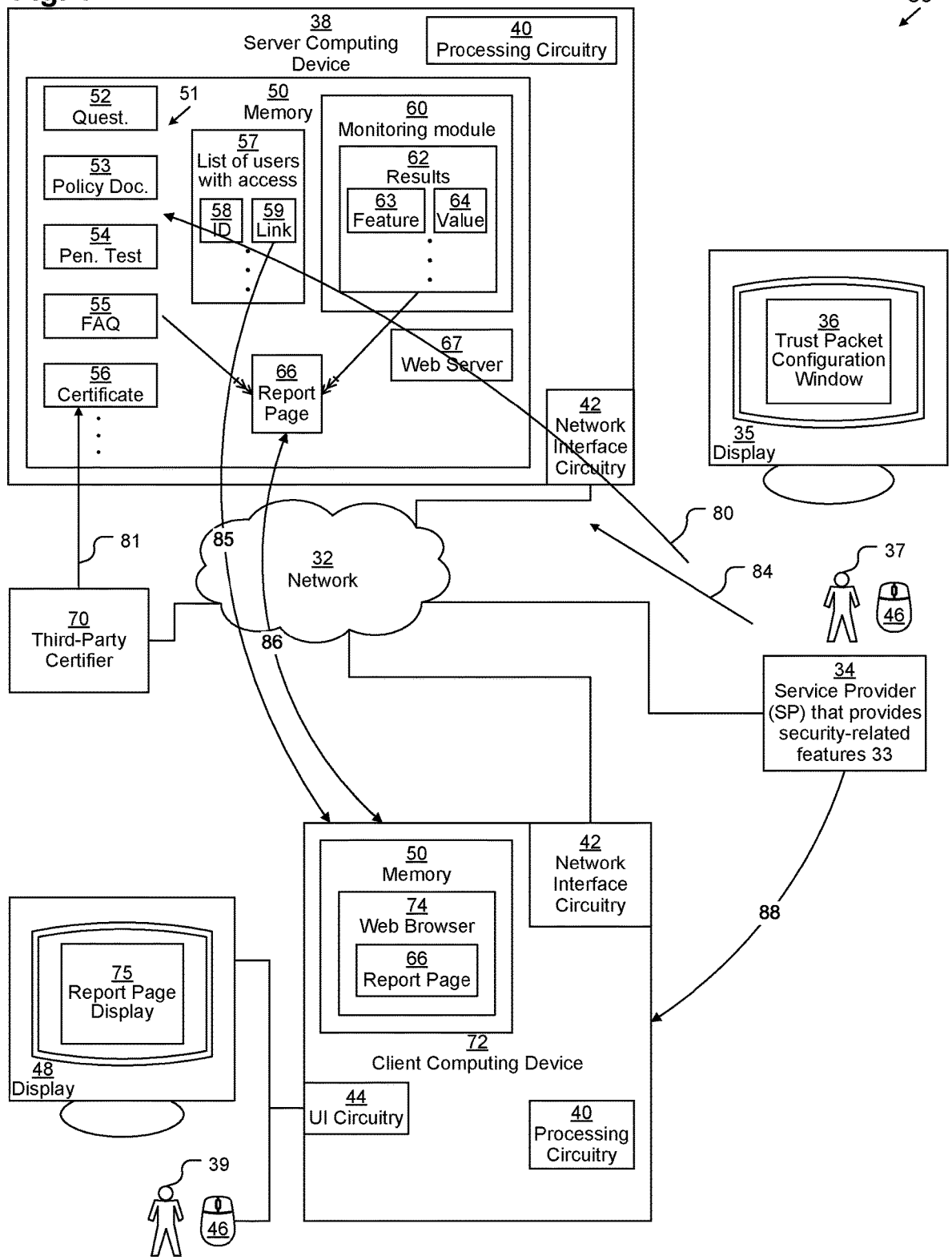
FIG. 1 illustrates an example system, apparatus, computer program product, and associated data structures for use in connection with one or more embodiments.

FIG. 1 depicts an example system 30 for use in connection with various embodiments. System 30 includes a network 32, a server computing device 38, a service provider (SP) 34, a third-party certifier, and a client computing device 72 operated by a user 39.

Network 32 may be any kind of communications network or set of communications networks, such as, for example, a LAN, WAN, SAN, the Internet, a wireless communication network, a virtual network, a fabric of interconnected switches, etc.

SP 34 is an entity that provides one or more services 88 to clients (e.g., client computing devices 72) with security-related features 33. Services 88 may be, for example, a cloud-based Software as a Service (SaaS). In one example, a service 88 may be an online e-mail service. In another example, a service 88 may be an online content creation platform. Security-related features 33 may include both security features (e.g., use of encryption, access controls, enforcement of a password policy, use of anti-malware software, etc.) and data privacy features (e.g., deleting customer data upon customers unenrolling, restricting access to customer data classified as confidential, deleting customer data upon request, etc.).

SP 34 may include one or more computers (e.g., servers), potentially arranged in a cloud configuration. SP 34 may include both frontend and backend computers. SP 34 may also include physical premises housing some of the computers. Employees of SP 34 may have access to the physical premises. SP 34 may also include physical access controls such as keycard-restricted entry limited only to employees, video monitoring, etc. These physical access controls may also be examples of the security-related features 33.

An employee of SP 34 may be an administrator 37 who accesses one or more computers of the SP using user input devices 46 and display screen 35. Display screen 35 may be any kind of display, including, for example, a CRT screen, LCD screen, LED screen, etc. Input devices 46 may include a keyboard, keypad, mouse, trackpad, trackball, pointing stick, joystick, touchscreen (e.g., embedded within display screen 35), microphone/voice controller, etc. Administrator 37 may remotely access server computing device 38 to configure how a report page 66 (also referred to as a "trust packet") is generated and distributed to potential customers. Administrator 37 may view and interact with a trust packet configuration window 36 in order to perform this configuration.

Both client computing device 72 and server computing device 38 may be any kind of computing device, such as, for example, a personal computer, laptop, workstation, server, enterprise server, tablet, smartphone, etc. Both client computing device 72 and server computing device 38 include processing circuitry 40, network interface circuitry 42, and memory 50. In addition, client computing device 72 also includes user interface (UI) circuitry 44 for connecting to a UI input device 46 and a display device 48. Client computing device 72 and server computing device 38 may also include various additional features as is well-known in the art, such as, for example, interconnection buses, etc.

Processing circuitry 40 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above.

Network interface circuitry 42 may include one or more Ethernet cards, cellular modems, Fibre Channel (FC) adapters, InfiniB and adapters, wireless networking adapters (e.g., Wi-Fi), and/or other devices for connecting to a network 38, such as, for example, a LAN, WAN, SAN, the Internet, a wireless communication network, a virtual network, a fabric of interconnected switches, etc.

Memory 50 may include any kind of digital system memory, such as, for example, random access memory (RAM). Memory 50 stores an operating system (OS, not depicted, e.g., a Linux, UNIX, Windows, MacOS, or similar operating system) and various drivers and other applications and software modules configured to execute on processing circuitry 40 as well as various data.

UI circuitry 44 may include any circuitry needed to communicate with and connect to one or more user input devices 46 and display screens 48. UI circuitry 44 may include, for example, a keyboard controller, a mouse controller, a touch controller, a serial bus port and controller, a universal serial bus (USB) port and controller, a wireless controller and antenna (e.g., Bluetooth), a graphics adapter and port, etc.

Display screen 48 may be any kind of display, including, for example, a CRT screen, LCD screen, LED screen, etc. Input device 46 may include a keyboard, keypad, mouse, trackpad, trackball, pointing stick, joystick, touchscreen (e.g., embedded within display screen 48), microphone/voice controller, etc. In some embodiments, instead of being external to client computing device 72, the input device 46 and/or display screen 48 may be embedded within the client computing device 72 (e.g., a cell phone or tablet with an embedded touchscreen).

Memory 50 of client computing device 72 stores a web browser 74, which is configured to execute on processing circuitry 40 of client computing device 72 to interface between a user 39 operating UI devices 46, 48 and the server computing device 38.

Memory 50 of server computing device 38 stores a monitoring module 60 as well as a web server 67. Monitoring module 60 is configured to monitor various features 33 of the SP 34 and to store the results 62 as they are updated. Results 62 may take the form of a table that stores a list of features 63 and corresponding values 64. In some embodiments, the values 64 may take the form of a Boolean value: 1 to indicate that the corresponding feature 63 is active, and 0 to indicate that the corresponding feature 63 is not active.

Web server 67 is configured to execute on processing circuitry 40 of server computing device 38 to interface with administrator 37 and user 39.

Memory 50 of server computing device 38 may also store a set of documents 51, a report page 66 that includes a report of the results 62 as well as links to documents 51, and a list 57 of users with access to the report page 66. Documents 51 may include one or more of a questionnaire 52 filled out with information about the SP 34 and the services 88 and features 33 that it provides, a policy document 53, penetration test results 54, Frequently Asked Questions and answers (FAQ), and a certificate 56 provided by a third-party certifier 70. List 57 of users with access to the report page 66 may take the form of a table that stores a list of user identifiers (IDs) 58 and corresponding links 59 to report page 66. In some embodiments, the user IDs 58 may be e-mail addresses of respective users. In some arrangements, each user may have its own corresponding link 59 to report page 66 such that only that user may access the report page 66 via that link 59. In some embodiments, the links 59 may have corresponding security policies that limit the usage of such links 59. In other arrangements, the list 57 may only include a single link 59 that is accessible to any user.

In operation, administrator 37 interfaces with web browser 67 via trust packet configuration window 36 to send particular documents 51 to server computing device 38 and to select which of those documents 51 should be included in report page 66 (step 80). In some embodiments, some of the documents 51 may be provided by an entity other than the SP 34. For example, in some embodiments, a third-party certifier 70 directly provides (step 81) a certificate 56 (e.g., a SOC-2 certificate, an ISO 27001 certificate, etc.) to the server computing device 38. In other embodiments, the third-party certifier 70 provides the certificate 56 to the SP 34, and then the administrator 37 may choose to provide that certificate 56 to the server computing device 38. As another example, in some embodiments, administrator 37 (or another representative of SP 34) fills out the questionnaire 52 based on policies and other information about the SP 34, after which administrator 37 sends the filled-out questionnaire 52 to the server computing device 38. In other embodiments, the server computing device 38 fills out the questionnaire 52 based on information already available to the server computing device 38 (e.g., via operation of monitoring module 60). In yet other embodiments, server computing device 38 begins filling out the questionnaire 52 based on information already available to the server computing device 38, and then administrator 37 may edit or supplement the answers on the questionnaire 52.

In some embodiments, the administrator 37 may also interface with web browser 67 via trust packet configuration window 36 to configure monitoring module to monitor for particular features 63.

In some embodiments, when a particular potential client of the SP 34 is interested in engaging SP 34 to provide a service 88 to that potential client, administrator 37 may interface (step 84) with web browser 67 via trust packet configuration window 36 to adjust the list 57 of users with access to report page 66 to include that particular potential client (e.g., by sending an e-mail address of that particular potential client to the server computing device 38 to serve as a user ID 58). This step (step 84) may also include establishing a policy for the link provided for that particular potential client (e.g., establishing an expiration policy or limiting access to a particular location, device, or application). Then, in step 85, server computing device 38 sends the link 59 to one or more client computing devices 72 of that particular potential client.

In other embodiments, administrator 37 interfaces with the web browser 67 via trust packet configuration window 36 to instruct the server computing device 38 to create a single link 59 that is accessible to anyone.

In step 86, user 39 operates the web browser 74 to access the report page 66 from the server computing device 38 via the link 59 (according to the security policy, if one is implemented). User 39 is able to then view the documents 51 as well as the results 62 of real-time (which includes periodic) monitoring (performed by monitoring module 60) of the security-related features 33 of the SP 34. The user 39 may then decide whether or not to engage the SP 34 to provide the service 88.

Memory 50 may also store various other data structures used by the OS, module 60, web server 67, web browser 74, and various other applications and drivers. In some embodiments, memory 50 may also include a persistent storage portion. Persistent storage portion of memory 50 may be made up of one or more persistent storage devices, such as, for example, magnetic disks, flash drives, solid-state storage drives, or other types of storage drives. Persistent storage portion of memory 50 is configured to store programs and data even while the computing device 38, 72 is powered off. The OS, modules 52, 60 and various other applications and drivers are typically stored in this persistent storage portion of memory 50 so that they may be loaded into a system portion of memory 50 upon a system restart or as needed. The OS, module 60, web server 67, web browser 74, and various other applications and drivers, when stored in non-transitory form either in the volatile or persistent portion of memory 50, each form a computer program product. The processing circuitry 40 running one or more applications thus forms a specialized circuit constructed and arranged to carry out the various processes described herein.

Figure 2:
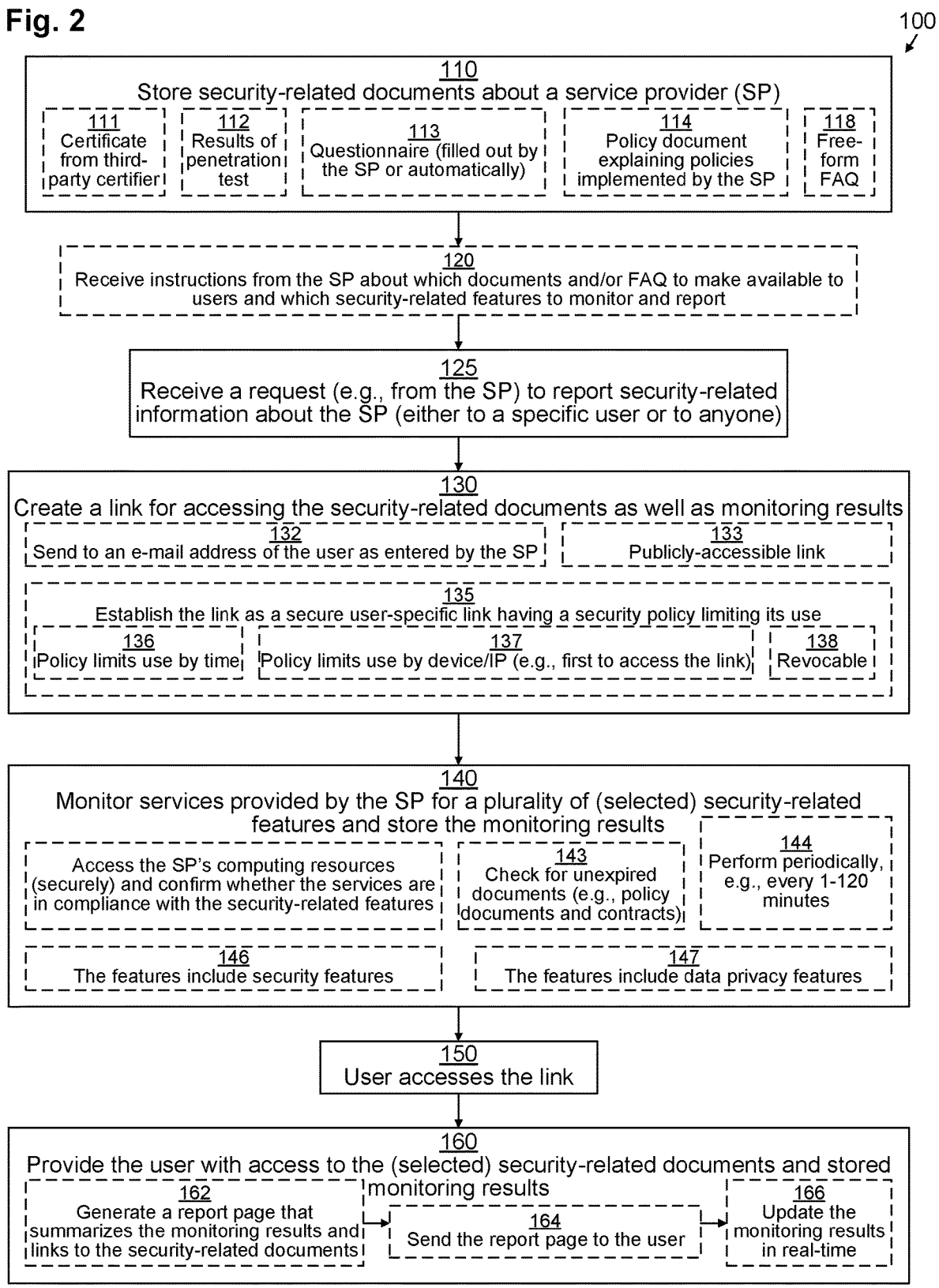
FIG. 2 illustrates an example method in accordance with one or more embodiments.

FIG. 2 illustrates an example method 100 performed by a system 30 for providing security-related information. It should be understood that any time a piece of software (e.g., OS, module 60, web server 67, web browser 74, etc.) is described as performing a method, process, step, or function, what is meant is that a computing device (e.g., client computing device 72 or server computing device 38) on which that piece of software is running performs the method, process, step, or function when executing that piece of software on its processing circuitry 40. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, server computing device 38 stores security-related documents 51 about an SP 34. Depending on the embodiment and the particular situation, these security-related documents 51 may be received from the SP 34, received from a third-party certifier 70, generated locally at the server computing device 38, or some combination thereof. Step 110 may include various sub-steps 111-118.

In sub-step 111, server computing device 38 stores a certificate 56 that was generated by a third-party certifier 70. This certificate 56 may either be received directly from the third-party certifier 70 (see step 81 from FIG. 1) or it may be received from the SP 34 or another source.

In sub-step 112, server computing device 38 stores results 54 from a penetration test that was performed by a third party (e.g., a security consultant). These results 54 may either be received directly from the third party, or they may be received from the SP 34 or another source.

In sub-step 113, server computing device 38 stores a questionnaire 52 that includes questions and answers about security policies and procedures of the SP 34. This questionnaire 52 may be received directly from the SP 34, it may be generated by the server computing device 38 based on information from the monitoring module 60, or it may be partially generated by the server computing device 38 with supplemental information and/or editing from the SP 34.

In sub-step 114, server computing device 38 stores a policy document 53 that includes descriptions of security policies and/or data privacy policies of the SP 34. This policy document 53 may be received directly from the SP 34.

In sub-step 118, server computing device 38 stores an FAQ 55 that includes questions and accompanying answers about security policies and/or data privacy policies of the SP 34. This FAQ 55 may be received directly from the SP 34. It should be understood that although FAQ 55 is depicted as a document 51, in some embodiments, FAQ 55 may be include questions and answers entered individually by administrator 37, e.g., by typing or copying and pasting.

In some embodiments, server computing device 38 receives instructions from the SP 34 (e.g., via administrator 37 interfacing with trust packet configuration window 36) about which documents 51 (potentially including FAQ 55 even if it was entered as a coherent document) to make available to users via report page 66 and which security-related features 33 to monitor and report on in the report page 66.

Figure 3:
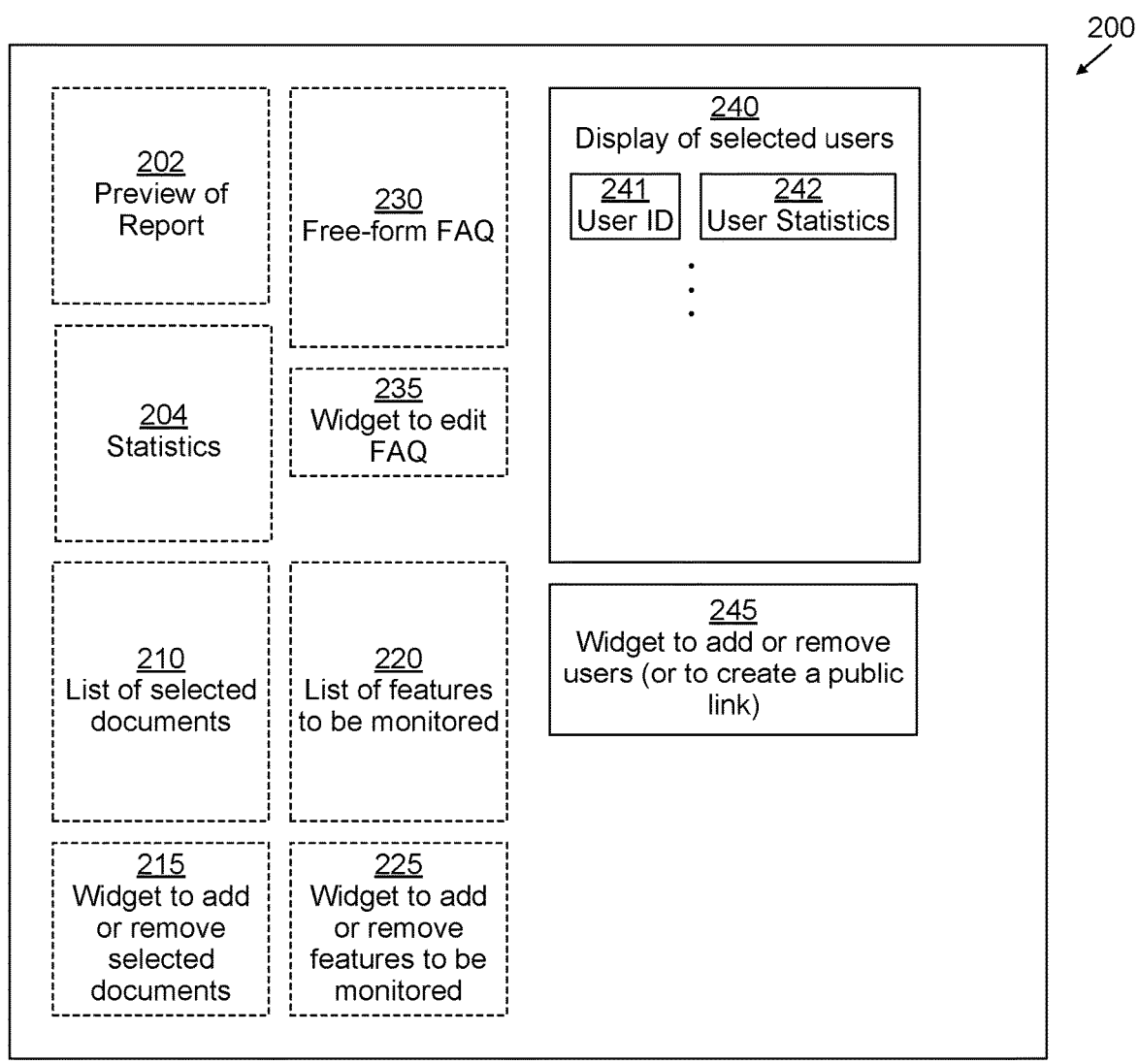
FIG. 3 illustrates an example configuration page used in conjunction with one or more embodiments.

FIG. 3 depicts an example configuration page 200 according to some embodiments. Configuration page 200 may be an example of a trust packet configuration window 36 generated by web server 67 and displayed to administrator 37 on display screen 35.

In some embodiments, configuration page 200 may include a preview 202 of what report page 66 would look like based on current configuration settings. In some embodiments, upon administrator 37 clicking on preview 202 using input device 46, web server 67 may navigate to display the preview 202 of what report page 66 would look like based on current configuration settings in the full window.

In some embodiments, configuration page 200 may include a display 204 of statistics about the report page 66, including, for example, information about how many of various types of documents 51 have been uploaded or how often each type of document 51 has been viewed by a user.

In some embodiments, configuration page 200 may include a list 210 of documents 51 selected to be included on the report page 66 and a widget 215 that allows the administrator 37 to add or remove documents 51 from being selected.

In some embodiments, configuration page 200 may include a list 220 of security-related features 33 selected to be monitored for by monitoring module 60 and then displayed on the report page 66 and a widget 225 that allows the administrator 37 to add or remove features 33 from being monitored.

In some embodiments, configuration page 200 may include a free-form FAQ 230 to be included on the report page 66 and a widget 235 that allows the administrator 37 to edit the FAQ 230.

Returning to FIG. 2, it should be understood that optional step 120 may include the administrator 37 interacting with widgets 215, 225, 235.

In step 125, server computing device 38 receives a request (e.g., from administrator 37 of SP 34) to report security-related information about the SP 34 on report page 66. With reference to FIG. 3, configuration page 200 includes a display 240 of selected users and a widget 245 to add or remove users (or to create a link 59 that is publicly accessible and/or publicly available). Display 240 may take the form of a table that displays the user IDs 241 of selected users and corresponding statistics 242 for the links 59 created for those users. Statistics 242 may include, for example, information about when the user identified by the corresponding user ID 241 clicked on the link 59 or otherwise viewed the report page 66. As another example, statistics 242 may include a number of times that the user identified by the corresponding user ID 241 clicked on the link 59 or otherwise viewed the report page 66. Thus, in step 125, administrator 37 may modify the list 240 by interacting with widget 245 to add a new user ID 241 (e.g., an e-mail address). Administrator 37 may modify the list 240 by interacting with widget 245 to request that a publicly-accessible link 59 be created which can be accessed by anyone having that link 59. In some embodiments, once a publicly-accessible link 59 has been created, the display 240 no longer includes the user IDs 241 and user statistics 242, while in other embodiments, the user IDs 241 and user statistics 242 remain in the display 240 together with an indication that a publicly-accessible link 59 has been created with statistics 242 about the publicly-accessible link 59. Widget 245 may also allow the administrator 37 to create a security policy (or modify a default security policy) about how any links 59 to be created are to be used.

Returning to FIG. 2, step 130 is performed in response to step 125. In step 130, server computing device 38 creates a link 59 for accessing the security-related documents 51 and the monitoring results 62 via report page 66, adding that link 59 into the list 57. Step 130 may include one or more of sub-steps 132-135.

In sub-step 132, which may be performed when step 125 included requesting reporting to a particular user, server computing device 38 sends the link 59 to an e-mail address for that particular user, as entered by the administrator 37 in step 125. In other embodiments, server computing device 38 sends the link 59 to that particular user using a different mode of communication (e.g., text message).

In sub-step 135, which may also be performed when step 125 included requesting reporting to a particular user, server computing device 38 establishes link 59 as a secure user-specific link having a security policy limiting its use. For example, link 59 may be generated with a cryptographic hash included therein that is uniquely-associated with the particular user. Sub-step 135 may include one or more of sub-steps 136-138.

In sub-step 136, server computing device 38 establishes a security policy that is limited by time. For example, link 59 may have an expiration time after which it is no longer valid. As another example, link 59 may have an expiration interval defined by the first time that the particular user accesses link 59 and an amount of time after that first time after which that link 59 is no longer valid.

In sub-step 137, server computing device 38 establishes a security policy that is limited by device or address (e.g., an IP address). For example, link 59 may be configured to only be accessible from a particular client computing device 72 (e.g., defined by its MAC address or another unique machine identifier) or a particular IP address associated with the particular user. As another example, the first time that the particular user accesses link 59, the IP address (and possibly also a port number or an application identifier) from which that particular user accessed link 59 may be recorded by the server computing device 38, after which that link 59 is only accessible from the recorded IP address (and possibly the port number or application identified by the application identifier).

In sub-step 138, server computing device 38 establishes a security policy that allows link 59 to be revoked by the administrator 37 at any time.

In sub-step 133, which may be performed when step 125 included requesting reporting to any user via a publicly-accessible link 59, server computing device 38 creates the publicly-accessible link 59 and provides it to the administrator 37 to disseminate.

In step 140, which may be performed by monitoring module 60 in the background, monitoring module 60 monitors the services 88 provided by the SP 34 for a plurality of features 63 (e.g., those features 33 selected by the administrator 37 in step 120), storing the results 62 as monitored. Step 140 may include one or more of sub-steps 142-147.

In sub-step 142, monitoring module 60 accesses computing resources of the SP 34 and confirms whether the services 88 are in compliance with the selected features 63. For example, monitoring module 60 may access backend computing resources to determine how the services 88 are provided. In some embodiments, this access may be performed securely. As another example, monitoring module 60 may access other computing resources, such as video cameras and keycard readers installed on premises of the SP 34 to ensure that no unauthorized persons are present who could interfere with security or data privacy. In some embodiments, this access may be performed securely.

In sub-step 143, monitoring module 60 checks computing resources of the SP 34 for particular unexpired documents (e.g., policy documents and contracts). For example, one selected feature 63 may be the existence of an unexpired data privacy policy. As another example, one selected feature 63 may be the existence of an unexpired contract with an antivirus provider or an insurance company.

Sub-step 144 indicates that step 140 is performed periodically (also referred to as "in real-time"). For example, step 140 is performed with a periodicity ranging between every 1 minute to every 120 minutes. A typical periodicity may be approximately once per hour.

In sub-step 146, monitoring module 60 monitors security features. Examples of security features may include whether encryption is used in various defined contexts, whether access controls are implemented in various defined contexts, whether various password policies are enforced (e.g., whether certain resources are blocked if a password is not entered, whether restrictions on types of passwords defined by policy are actually enforced when passwords are being created, etc.), whether anti-malware software is running, etc.

It should be understood that many more types of security features may also be monitored.

In sub-step 147, monitoring module 60 monitors data privacy features. Examples of data privacy features may include whether customer data is actually deleted upon customers unenrolling from a service 88 maintained by the SP 34, whether access to customer data classified as confidential is restricted, whether customer data requested to be deleted is actually deleted, etc. It should be understood that many more types of data privacy features may also be monitored.

In step 150, a user may access a link 59, e.g., via web browser 74 operating on a client computing device 72. In embodiments in which a security policy may be used (see above in connection with sub-step 135), server computing device 38 enforces the security policy upon the user 39 accessing link 59.

In response to step 150, in step 160, server computing device 38 (e.g., via web server 67) provides user 39 with access to the (selected) security-related documents 51 and stored monitoring results 62 via report page 66 downloaded to web browser 74. User 39 may view a report page display 75 on display screen 48. In some embodiments, step 160 may include sub-steps 162-166.

Figure 4:
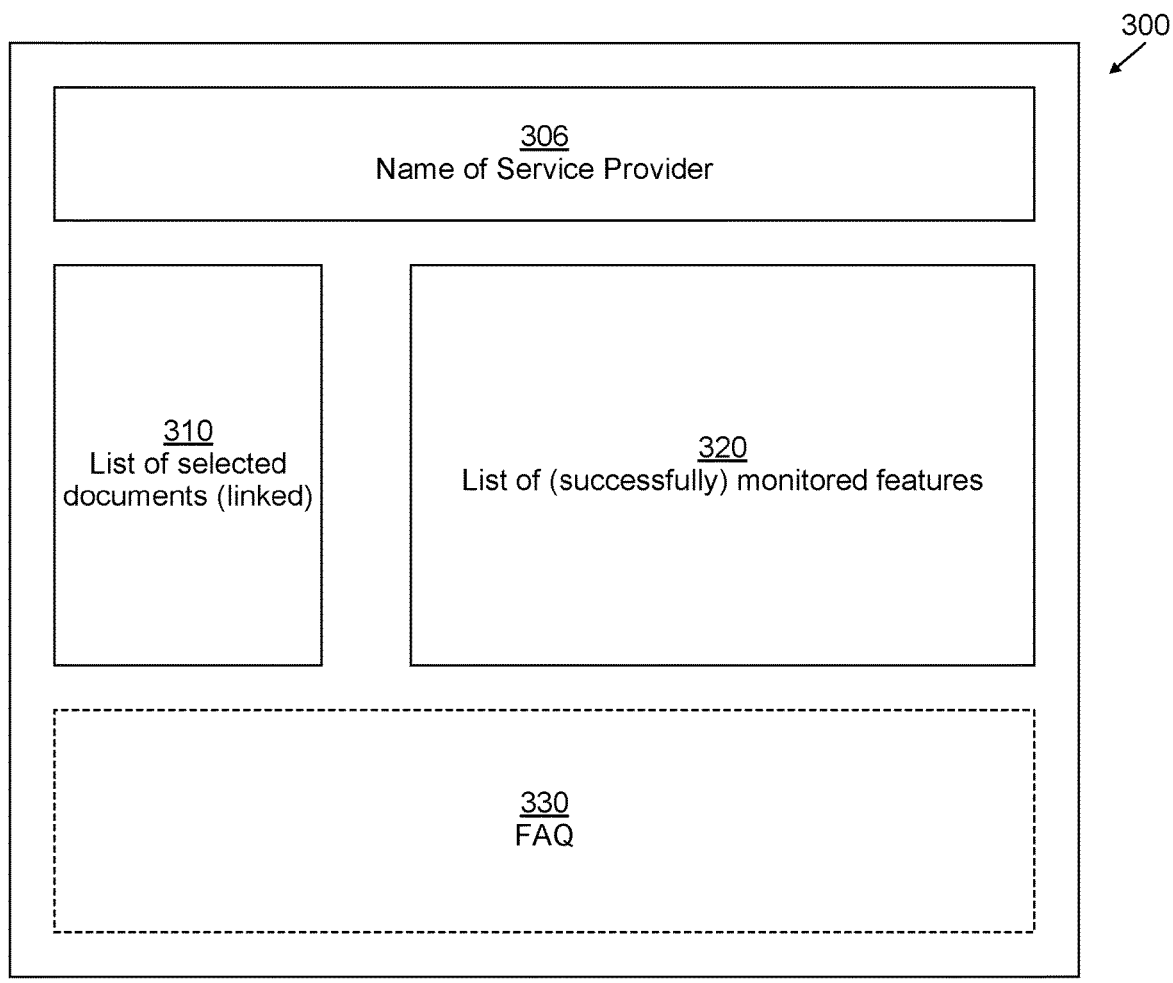
FIG. 4 illustrates an example report page used in conjunction with one or more embodiments.

In sub-step 162, server computing device 38 generates report page 66 that summarizes the monitoring results 62 and links to the selected security-related documents 51. FIG. 4 depicts an example report page 300. Report page 300 may include the name 306 of the SP 34, a list 310 with links to the selected security-related documents 51, and a list of features 63 monitored by the monitoring module 60. In some embodiments, only features 63 whose respective result values 64 are affirmative are displayed in list 320; thus features 63 whose respective result values 64 are negative are omitted from being displayed in list 320. In other embodiments, features 63 whose result values 64 are negative are also displayed in list 320 together with an indication that those features 63 were not confirmed. In some embodiments, list 320 includes an indication of the last time that the stored monitoring results 62 were updated. In some embodiments, FAQ 330 is displayed on report page 300 separately from the other security-related documents 51. Although the other security-related documents 51 are only linked to from report page 300, FAQ 330 may be displayed directly on report page 300.

Returning to FIG. 2, in sub-step 164, web server 67 sends report page 66, 300 to the web browser 74 for display of report page display 75 on display screen 48. In sub-step 166, upon the results 62 being updated in real-time (see sub-step 144 above), server computing device 38 updates the results 62 on report page 66, 300, and web server 67 sends an update to web browser 74 so that report page display 75 can be updated on display screen 48.

Thus, a tool has been provided that allows an SP 34 to send the same information (e.g., report page 66, 300) to one or more potential customers, freeing the customers from having to individually request information and freeing SP 34 from having to provide individualized responses to every potential customer. The tool also allows monitoring module 60 to monitor services 88 provided by SP 34 in real-time for security-related features 33, ensuring that security and data privacy policies are actually followed and that documents are updated regularly. The tool may allow SP 34 to select documents 51 to provide to one or more requesting customers. The tool may further allow SP 34 to select particular security-related features 63 to be monitored and reported on in real-time or periodically. Customers may be provided with link 59 to an updated report 66, 300 at which the customer may view documents 51 as well as real-time results 62 of monitored security-related features 63. In some embodiments, a customer may be assigned an individualized secure link 59 in response to SP 34 requesting access for that customer. In other embodiments, SP 34 may instead request that a public link 59 be created for use by any customer.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art" or as "conventional," Applicants make no admission that such technique, method, apparatus, or other concept is actually prior art under 35 U.S.C. § 102 or 103, such determination being a legal determination that depends upon many factors, not all of which are known to Applicants at this time.

What is claimed is:

1. A method, performed by a computing system, of providing security-related information, the method comprising:
   storing, by the computing system, security-related documents about a service provider;
   monitoring, by the computing system, services provided by the service provider for a plurality of security-related features, and storing monitoring results;
   receiving, by the computing system, a request to report security-related information about the service provider;
   in response to receiving the request, creating a link for accessing the security-related documents and the monitoring results, including associating the link with a security policy that limits use of the link, the security policy being an access point policy;
   in response to a user accessing the link, providing, by the computing system, the user with access to the security-related documents and monitoring results, including associating the link with an access point from which the user initially accessed the link; and
   subsequent to the user initially accessing the link, refusing access to the link from outside the access point.

2. The method of claim 1 wherein monitoring the services provided by the service provider for the plurality of security-related features includes accessing computing resources of the service provider and confirming whether the services are in compliance with one or more of the plurality of security-related features.

3. The method of claim 2 wherein storing the monitoring results is performed periodically.

4. The method of claim 2 wherein monitoring for the plurality of security-related features includes monitoring the computing resources for security features, including:
   access controls and
   use of anti-malware software.

5. The method of claim 2 wherein monitoring for the plurality of security-related features includes monitoring the computing resources for data privacy features, including:
   deleting customer data upon customers unenrolling and
   deleting customer data upon request.

6. The method of claim of claim 2 wherein accessing the computing resources includes accessing a backend of the service provider for compliance with the one or more of the plurality of security-related features.

7. The method of claim of claim 2 wherein accessing the computing resources includes checking for unexpired documents maintained by the service provider.

8. The method of claim 1 wherein:
   receiving the request includes receiving an e-mail address that identifies the user; and
   creating the link further includes:
      associating the link with the received e-mail address; and
      sending the link to the received e-mail address.

9. The method of claim 1 wherein:
   the security policy is time-limited policy having an expiration; and
   the method further comprises refusing access to the link after the expiration.

10. The method of claim 1 wherein providing the user with access to the security-related documents and monitoring results includes:
   generating a report page that summarizes the monitoring results and links to the security-related documents; and
   sending the report page to the user.

11. A computer program product comprising a non-transitory computer-readable storage medium storing a set of instructions, which, when executed by a computing system, caused the computing system to provide security-related information by:
   storing security-related documents about a service provider;
   monitoring services provided by the service provider for a plurality of security-related features, and storing monitoring results;
   receiving a request to report security-related information about the service provider;
   in response to receiving the request, creating a link for accessing the security-related documents and the monitoring results, including associating the link with a security policy that limits use of the link, the security policy being an access point policy; and
   in response to a user accessing the link, providing the user with access to the security-related documents and the monitoring results, including associating the link with an access point from which the user initially accessed the link; and
   subsequent to the user initially accessing the link, refusing access to the link from outside the access point.

12. The computer program product of claim 11 wherein monitoring the services provided by the service provider for the plurality of security-related features includes accessing computing resources of the service provider and confirming whether the services are in compliance with one or more of the plurality of security-related features.

13. A system comprising:
   a network;
   a service provider connected to the network; and
   one or more computing devices including processing circuitry coupled to memory configured to provide security-related information by:
      storing security-related documents about the service provider;
      monitoring, via the network, services provided by the service provider for a plurality of security-related features, and storing monitoring results;
      receiving, via the network, a request to report security-related information about the service provider;
      in response to receiving the request, creating a link for accessing the security-related documents and the monitoring results, including associating the link with a security policy that limits use of the link, the security policy being an access point policy; and
      in response to a user accessing the link, providing, via the network, the user with access to the security-related documents and the monitoring results, including associating the link with an access point from which the user initially accessed the link; and
      subsequent to the user initially accessing the link, refusing access to the link from outside the access point.

14. The system of claim 13 wherein monitoring the services provided by the service provider for the plurality of security-related features includes accessing computing resources of the service provider via the network and confirming whether the services are in compliance with one or more of the plurality of security-related features.

15. The system of claim 13 wherein:
   receiving the request includes receiving an e-mail address that identifies the user; and
   creating the link further includes:
      associating the link with the received e-mail address; and
      sending the link to the received e-mail address.

* * * * *